Figure 4:
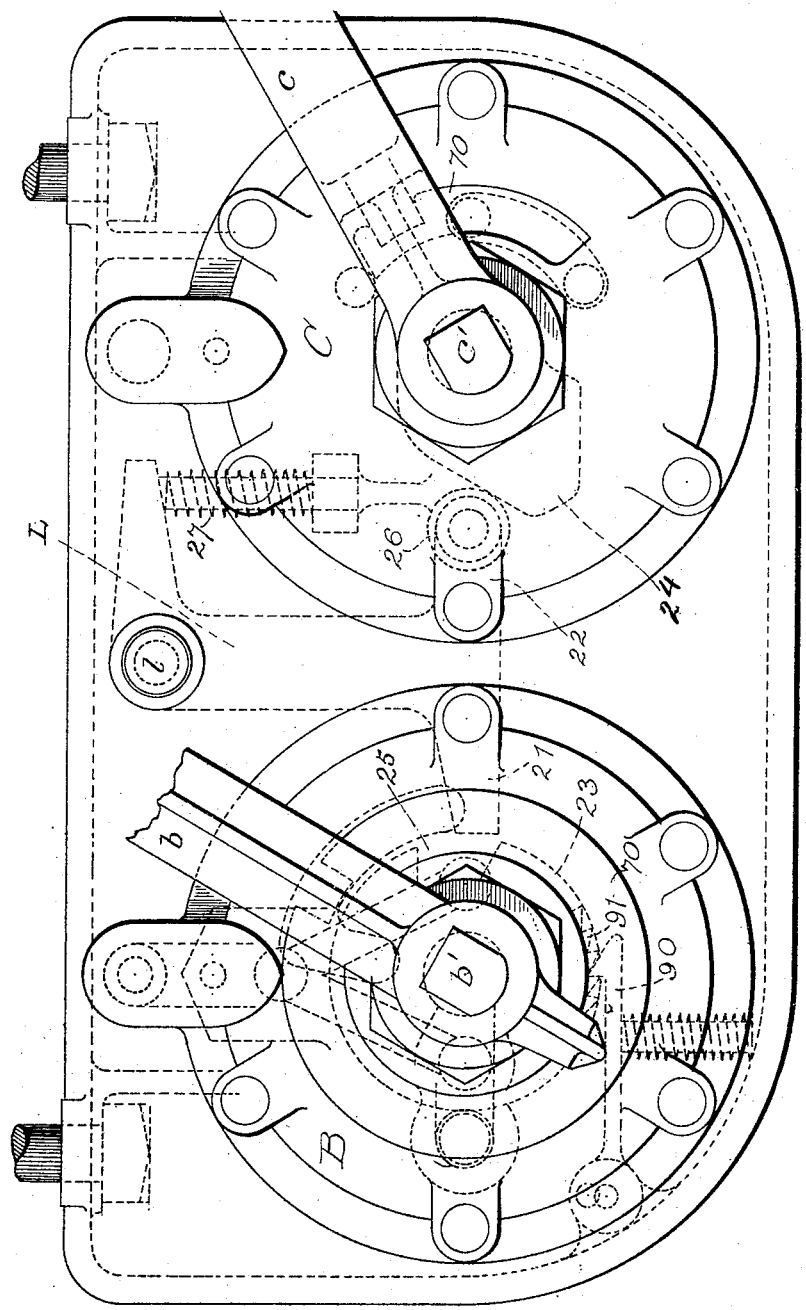

No. 641,843. Patented Jan. 23, 1900.
W. COOPER.
PNEUMATIC CONTROLLING SYSTEM FOR ELECTRIC RAILWAY CARS.
(Application filed June 23, 1898.)
(No Model.) 10 Sheets—Sheet 1.
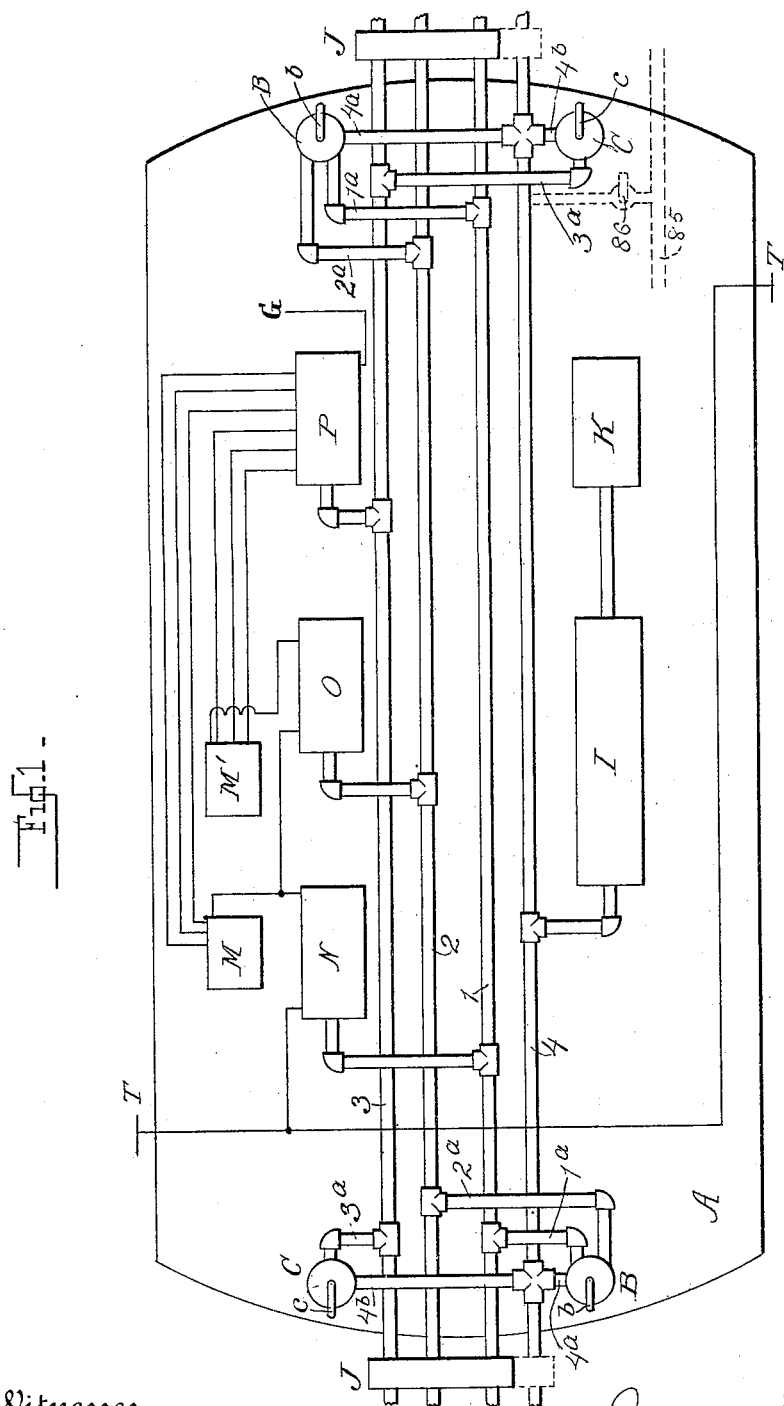

No. 641,843. Patented Jan. 23, 1900.
W. COOPER.
PNEUMATIC CONTROLLING SYSTEM FOR ELECTRIC RAILWAY CARS.
(Application filed June 23, 1898.)
(No Model.) 10 Sheets—Sheet 2.
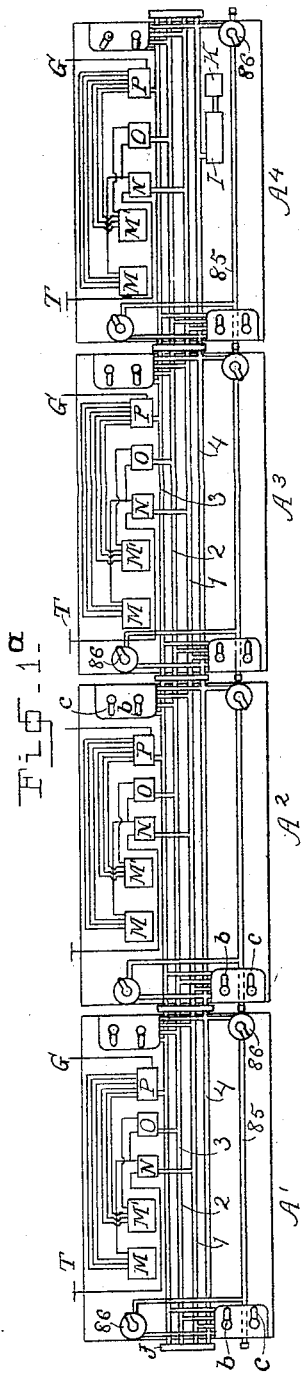

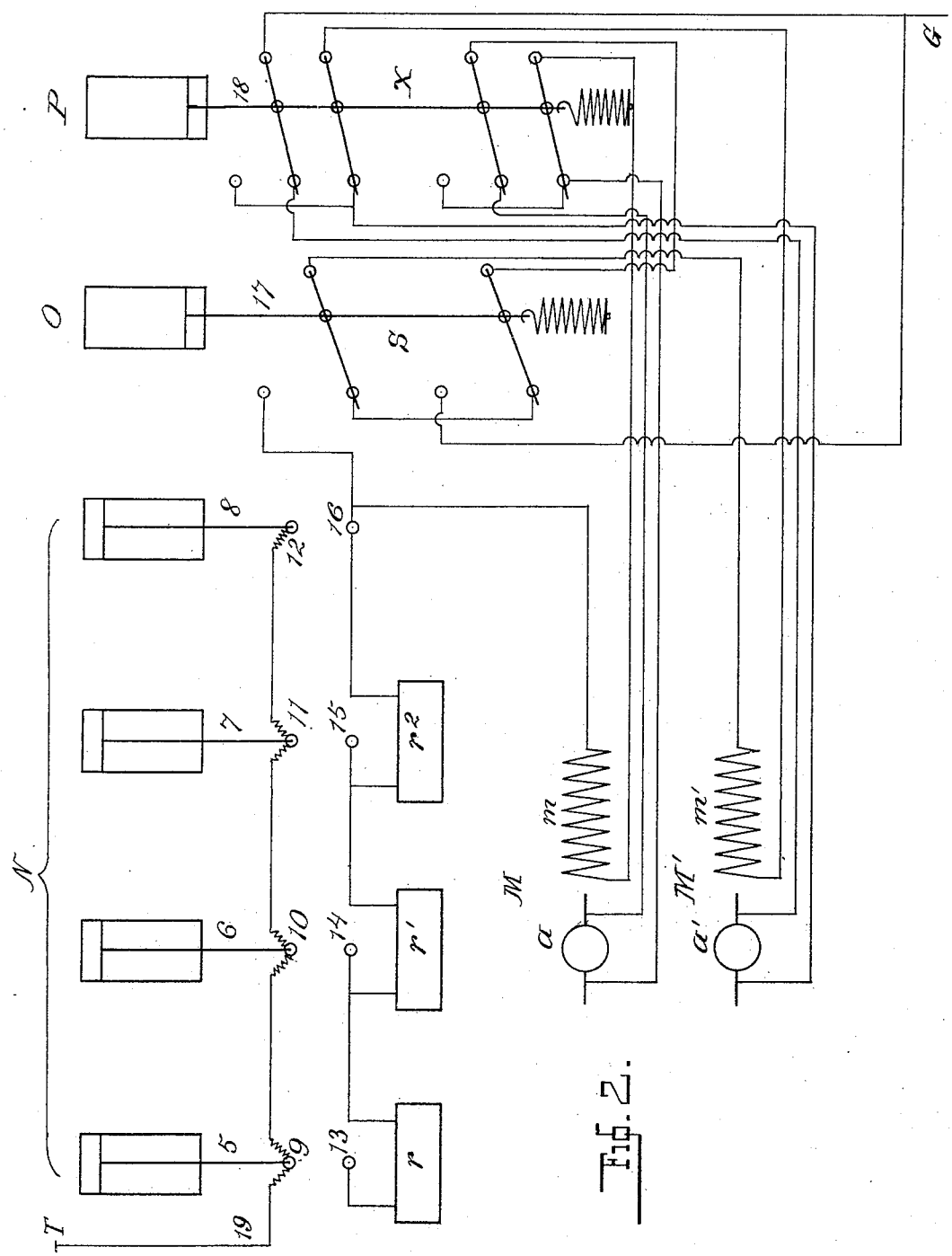

No. 641,843. Patented Jan. 23, 1900.
W. COOPER.
PNEUMATIC CONTROLLING SYSTEM FOR ELECTRIC RAILWAY CARS.
(Application filed June 23, 1898.)
(No Model.) 10 Sheets—Sheet 4.
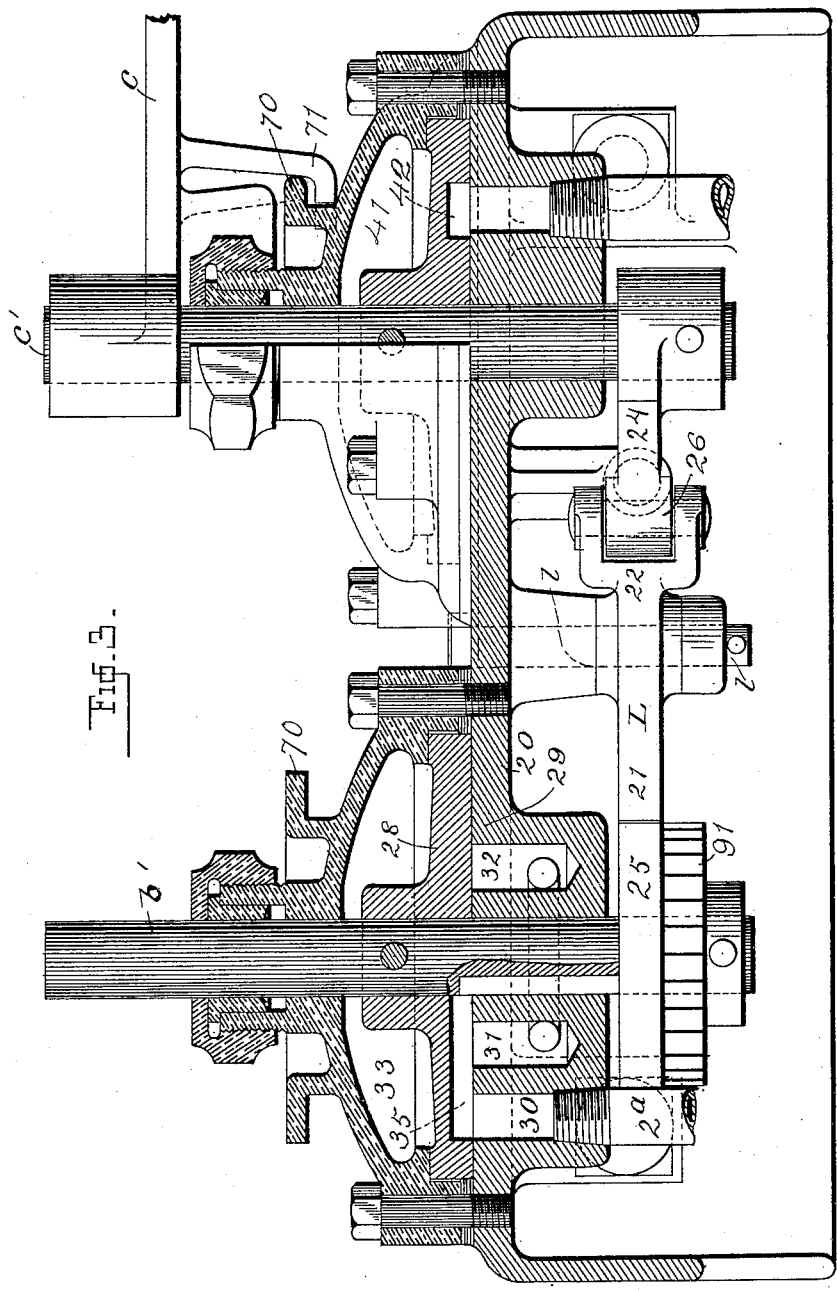

No. 641,843. Patented Jan. 23, 1900.
W. COOPER.
PNEUMATIC CONTROLLING SYSTEM FOR ELECTRIC RAILWAY CARS.
(Application filed June 23, 1898.)
(No Model.) 10 Sheets—Sheet 5.

Witnesses
M. V. Bidgood
H. P. Hammond

Inventor
William Cooper
By his Attorneys

THE NORRIS PETERS CO., PHOTO-LITHO., WASHINGTON, D. C.

No. 641,843. Patented Jan. 23, 1900.
W. COOPER.
PNEUMATIC CONTROLLING SYSTEM FOR ELECTRIC RAILWAY CARS.
(Application filed June 23, 1898.)
(No Model.) 10 Sheets—Sheet 6.

No. 641,843. Patented Jan. 23, 1900.
W. COOPER.
PNEUMATIC CONTROLLING SYSTEM FOR ELECTRIC RAILWAY CARS.
(Application filed June 23, 1898.)

(No Model.) 10 Sheets—Sheet 7.

Witnesses
Inventor
William Cooper
By his Attorneys

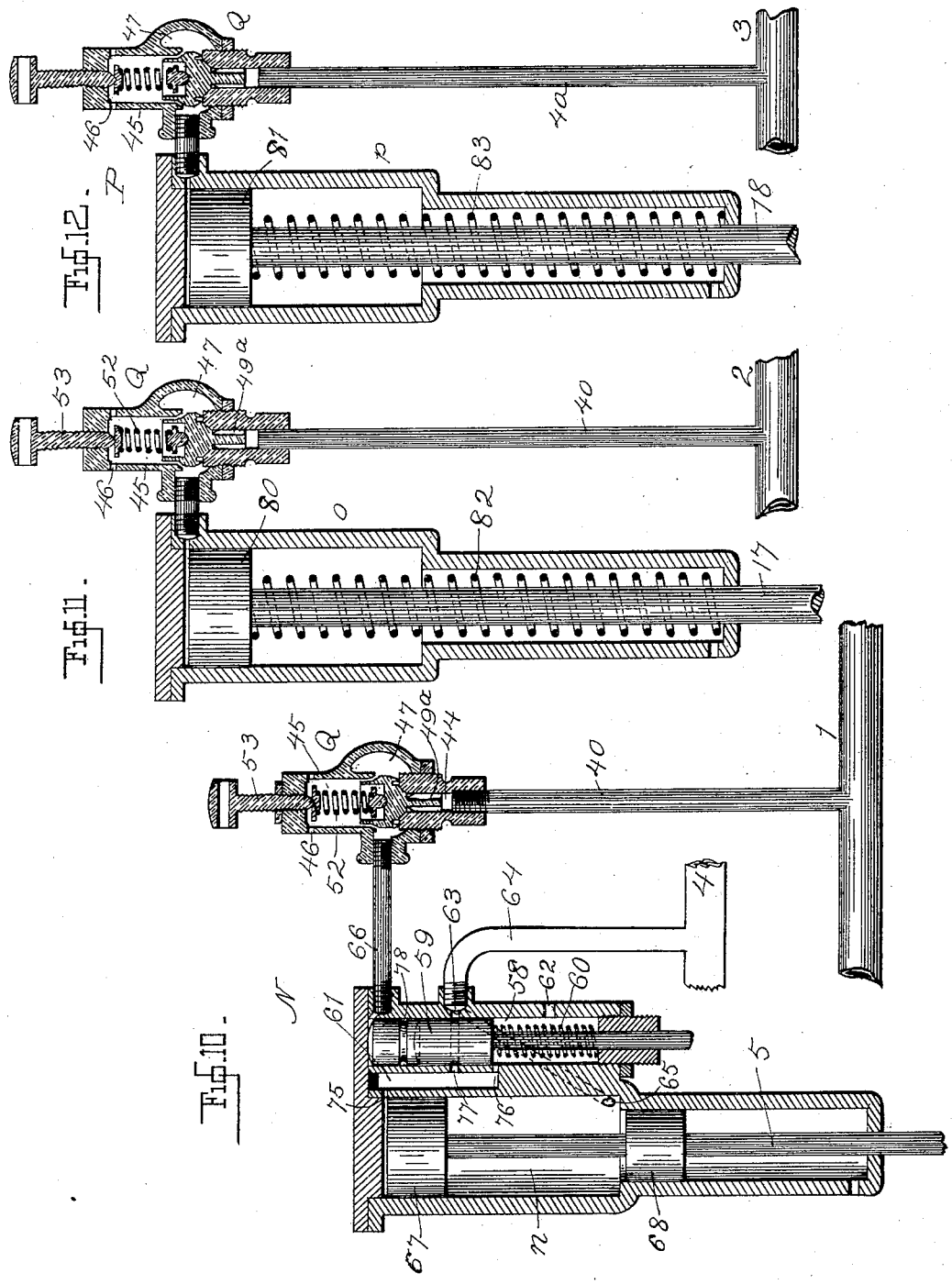

No. 641,843. Patented Jan. 23, 1900.
W. COOPER.
PNEUMATIC CONTROLLING SYSTEM FOR ELECTRIC RAILWAY CARS.
(Application filed June 23, 1898.)
(No Model.) 10 Sheets—Sheet 9.

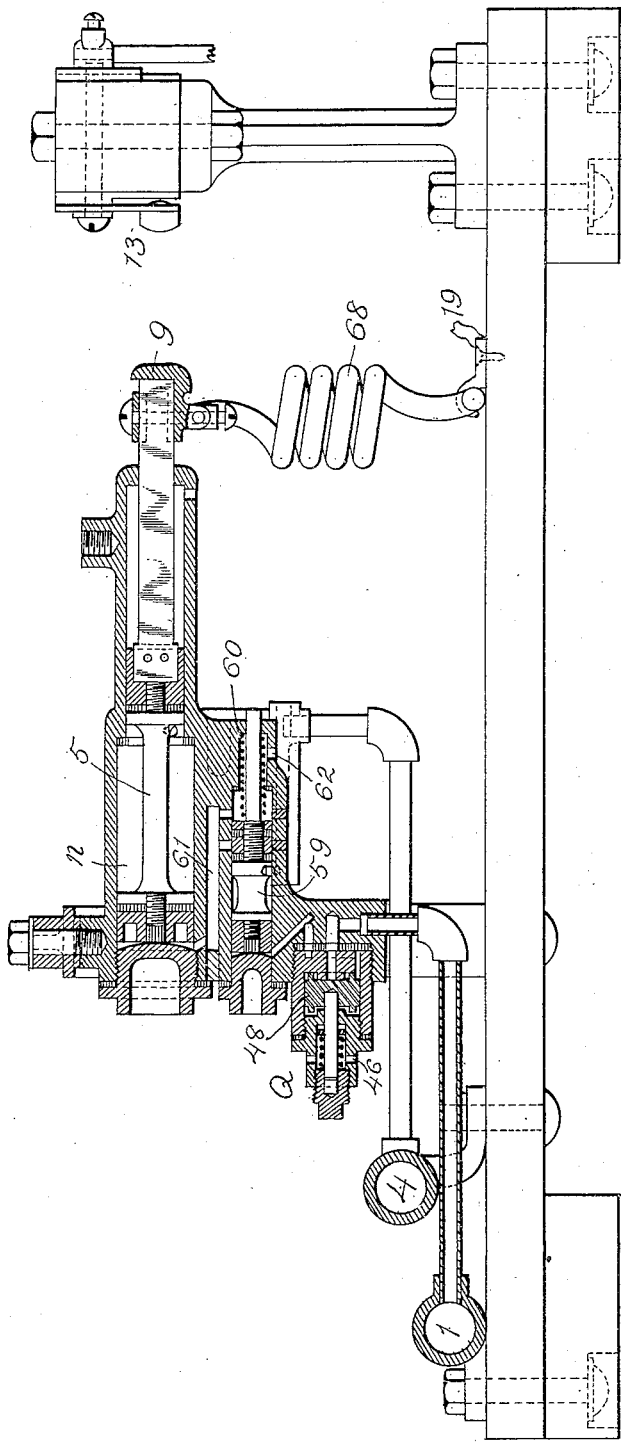

UNITED STATES PATENT OFFICE.

WILLIAM COOPER, OF CINCINNATI, OHIO, ASSIGNOR OF FIVE-SIXTHS TO BLOOD & HALE, OF BOSTON, MASSACHUSETTS.

PNEUMATIC CONTROLLING SYSTEM FOR ELECTRIC-RAILWAY CARS.

SPECIFICATION forming part of Letters Patent No. 641,843, dated January 23, 1900.

Application filed June 23, 1898. Serial No. 684,241. (No model.)

*To all whom it may concern:*

Be it known that I, WILLIAM COOPER, a citizen of the United States, residing at Cincinnati, county of Hamilton, State of Ohio, have invented certain new and useful Improvements in Pneumatic Controlling Systems for Electric-Railway Cars, of which the following is a specification.

This invention relates to a pneumatic controlling system for electric-railway cars, the same being especially intended for the simultaneous control of a plurality of motor-cars in an electrically-propelled train.

In carrying out my invention I prefer to provide each car of the train with a complete equipment of electric motors and their accessory current-collecting and other devices for electric propulsion with a complete equipment for pneumatic control and with a complete air-brake system, so that each car can be operated independently as a separate unit complete in every respect, while by means of pneumatic or fluid-pressure connections between the cars when they are associated in a train I am enabled to effect the pneumatic control of the whole train from either end of any car in the train or from any desired point in the train.

I prefer to use the system in connection with the usual air-brake system, as the necessary pneumatic supply may be taken from the same sources that supply the air-brakes.

The motor equipments of each car preferably comprise, as usual, two associated motors arranged to be connected either in series or parallel, and the pneumatic controlling system comprises three divisions or sets of devices corresponding to the three distinct functions of the usual electric-car controller—first, means for reducing or increasing step by step the resistance necessarily introduced in series with the motors in either their series or their multiple position; second, means for changing connections of the motors from series to parallel, and, third, means for reversing direction of rotation of the motors. For each of these several functions and corresponding sets of apparatus a separate train-pipe is used extending from car to car throughout the train, such pipes connecting in each car with the electric controlling apparatus and with the usual controlling devices, whereby the admission of air thereto is regulated. For supplying the air a connection may be made to such regulating devices from an air-reservoir on each car or from a general train supply-pipe.

The manually-operated resistance-regulating device and the connection-changing or series-parallel device are operated by the same handle, whose various positions to accomplish the proper control of the car may be indicated by pointer and notches on a dial. The reversing device is operated by a separate handle, which may be interlocked with the other to prevent its movement when current is on motors, the above handling arrangements being in conformity with the present practice in operating electric cars.

In all of the pneumatically-operated devices for effecting the several functions above specified I prefer to employ an accessory pop-valve responsive to definite change of pressure to bring the respective circuit-controlling device into and out of operation in a quick and effective manner, the main controlling device remaining inactive until the pop-valve operates and being then thrown quickly and with certainty to the full extent of its movement. The great desirability of this feature lies in giving more accurate control and doing away with the drawing of arcs which would ensue from such a slow and more or less uncertain control as would be given by direct connection.

Figure 5:
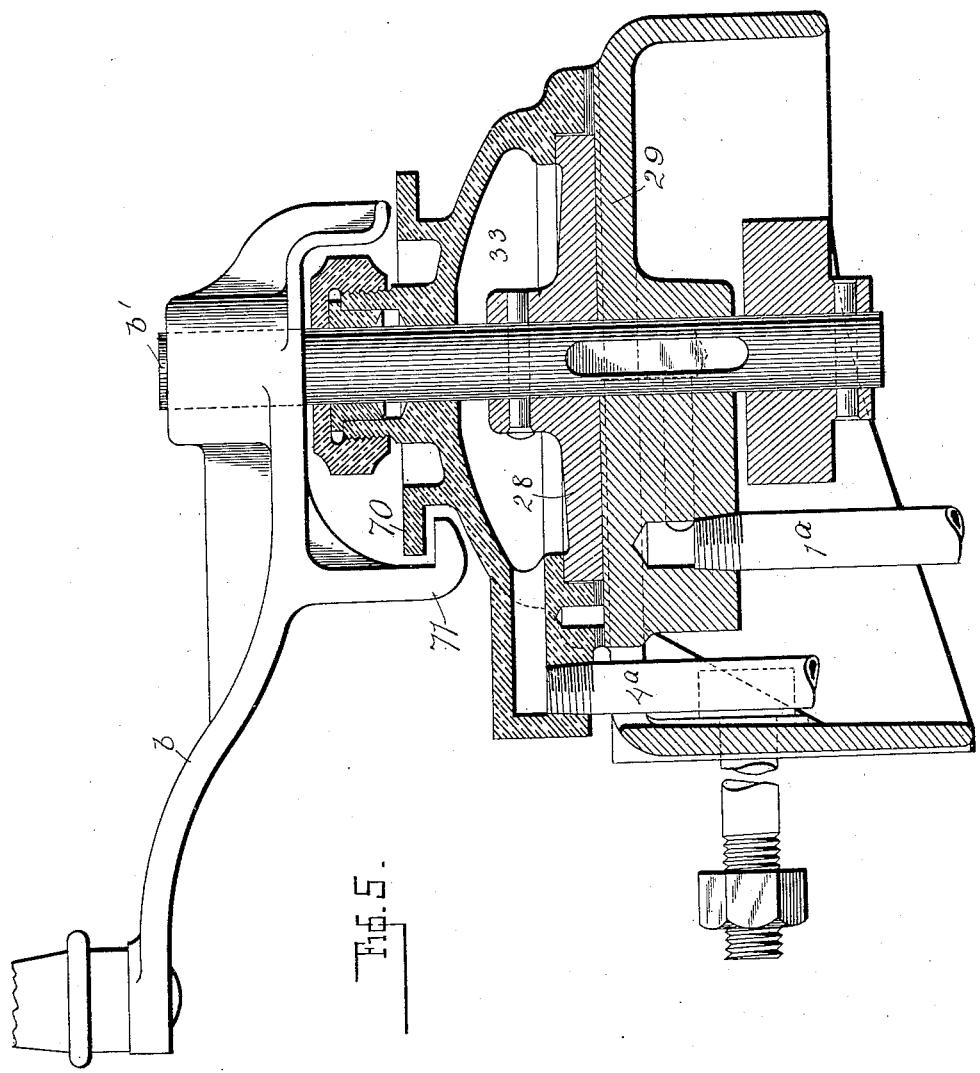
Figure 6:
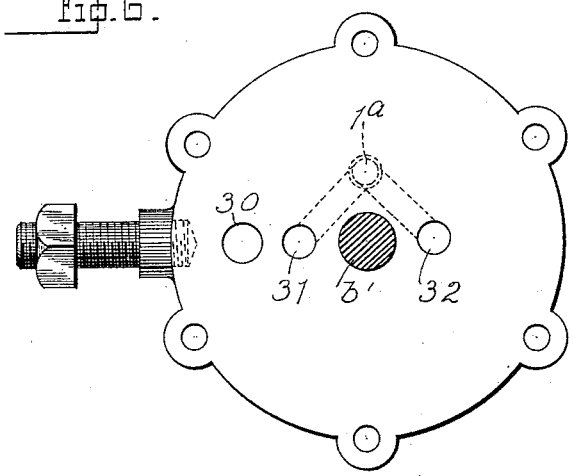
Figure 7:
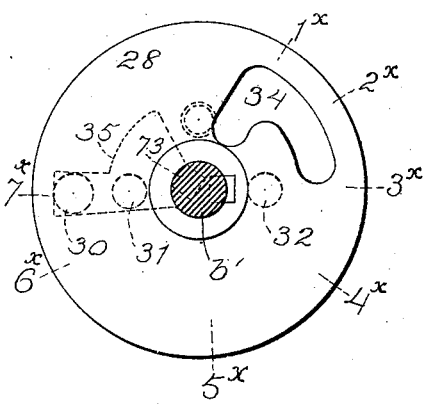
Figure 8:
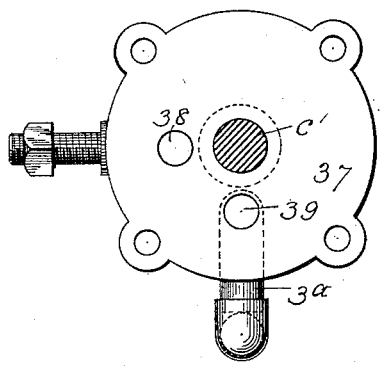
Figure 9:
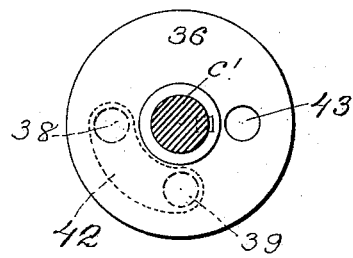
Figure 13:
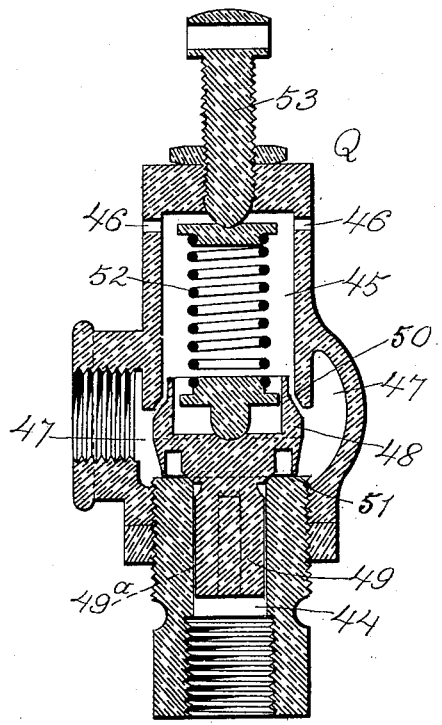
Figure 14:
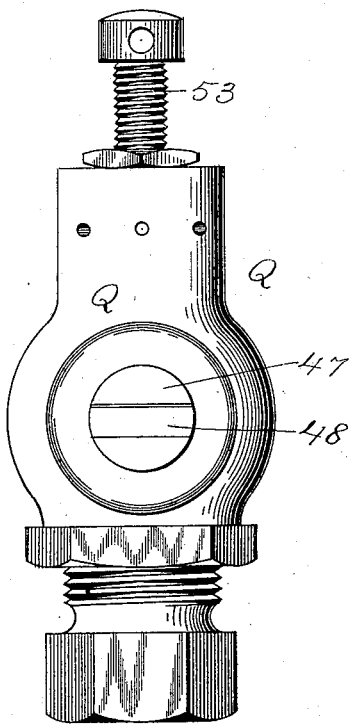

Referring to the accompanying drawings, which form a part of this specification, Figure 1 is a diagrammatic plan of a car provided with my controlling system. Fig. 1ª is a similar diagram showing a number of cars connected to form a train. Fig. 2 is a diagram of the electrical connections. Fig. 3 is a vertical section of the manual controlling device. Fig. 4 is a top view of same. Fig. 5 is a section through the series-parallel valve transverse to Fig. 3. Figs. 6 and 7 are plan views, respectively, of the seat and valve-plate of the rheostatic and series-parallel controlling-valve. Figs. 8 and 9 are similar views of the manual reverser-valve. Figs. 10, 11, and 12 are axial sections of the pneumatically-operated rheostatic, series-parallel, and reversing devices, respectively. Figs. 13 and 14 are respectively a vertical section and an elevation of the pop-valve. Fig. 15 is a section of one of the rheostatic operating devices, showing the several pneumatic parts united in one structure.

Each car of the train, or at least each motor-car thereof, is provided with a full equipment for electric propulsion and for pneumatic control, as indicated diagrammatically in Fig. 1, where A represents the car-body; M M, the two motors of the electric equipment; T, the traveling contacts or current-collecting devices, and N O P, respectively, the rheostatic controlling device, the series-parallel controlling device, and the reversing device for such motors. In Fig. 1ª four of such cars A' A² A³ A⁴ are shown connected together to form a train. The pneumatic equipment of each car comprises three pipes 1 2 3, connected, respectively, to the rheostatic controlling device N, the series-parallel controlling device O, and the reversing device P. Manually-operated valves or controlling devices control the connections between the several pipes N O P and a source of compressed-air supply, which preferably consists of the same reservoir and air-pump that are usually employed to effect the operation of the air-brakes, such reservoir and pump being indicated at I and K, respectively. The controlling-valves for the pipes 1 2 are preferably associated in a single-valve structure B, so as to be operated by a single handle $b$, as indicated, while the reversing-valve C has a separate handle $c$. Manual controlling devices B C are preferably arranged at each end of each car of the train. The pipes 1 2 3 extend through the train from car to car, connections being made between the successive cars by means of couplings J, preferably arranged to connect all the corresponding pipes at one operation and to interlock, so as to prevent wrong connection. A fourth pipe 4 is used on each car to connect the air-reservoir I with the manual controlling devices B C, and this pipe may also be connected from car to car to form a train-pipe, as indicated in dotted lines in Fig. 1; but this is not absolutely necessary, except where one or more of the cars are unprovided with air compressing and storing means. In addition to the above pipes the usual train brake-pipe (indicated by dotted lines at 85 in Fig. 1) may extend throughout the train and be connected to controlling-valves, of which one is indicated at 86, and the brake mechanism in the usual manner. Such apparatus being well known, it is not necessary to describe it further here.

By the operation of the handle $b$ the pressure in train-pipes 1 and 2 may be controlled so as to operate the rheostatic and series-parallel controlling devices. Inasmuch as it is generally desirable to cut the resistance into and out of the motor-circuit in several steps, so as to properly graduate the current changes, the rheostatic device comprises several contact-operating devices, which are brought successively into action in response to successive variations in the pressure in the rheostatic train-pipe 1, and I prefer to construct these devices so that each contact-making element will not come into operation at all until a certain definite pressure is reached, when the said element will be operated suddenly and to the full extent of its movement, as hereinafter described.

In Fig. 2 are shown the electrical connections indicating the manner in which the several pneumatically-controlled devices N O P control the operating-circuits of the car. The rheostatic device N is here shown as comprising four pneumatically-operated plungers 5, 6, 7, and 8, (here indicated diagrammatically,) carrying contacts 9 10 11 12, which coöperate with fixed contacts 13 14 15 16 to control the connections of resistances $r$ $r'$ $r^2$. The series-parallel device O also comprises a pneumatically-operated plunger 17, operating the contacts of the series-parallel switch S, and the reversing device P comprises a pneumatically-operated plunger 18, operating the contact-arms of the reversing-switch X. All of the contacts 9 10 11 12 are connected to the line connection 19, preferably by a yielding or flexible connection. In the position indicated in Fig. 2 all of these contacts are breaking circuit. The several plungers 5 6 7 8 are adapted to be operated dissimultaneously, each one responding to a different condition of air-pressure in the controlling-pipe. Thus plunger 5 may be brought into operation to close contacts 9 13 when a pressure of twenty-five pounds is attained in the rheostatic train-pipe. Then as the pressure is increased the plunger 6 may come into operation at a pressure of forty-five pounds, plunger 7 at sixty-five pounds, and plunger 8 at eighty-five pounds. In decreasing the train-pipe pressure these plungers will open the contacts in reverse order. Assuming, for illustration, that the manual controlling devices have been operated to bring pressure on all three train-pipes 1, 2, and 3, the pressure in train-pipe 1 being sufficient to cause operation only of the first plunger 5, as indicated by dotted line, then the current can pass from line-contact T through connection 19, contacts 9 and 13, and through all the resistances $r$ $r'$ $r^2$ to field-magnet $m$ of motor M, thence to reversing-switch X, back to armature $a$ of same motor M, through the reversing-switch X and to the series-parallel switch S and through said switch to the other motor, the circuit being completed through the field-magnet $m'$ and armature $a'$ of the motor M' by the reversing-switch and series-parallel switch, finally leading to ground connection G. The operation of the reversing and series-parallel switches in changing the motor connections is obvious and well known and need not be further described. As to the rheostatic switches, it will be noted that as the plungers 6 7 8 are brought successively into operation by further increase of pressure in the corresponding train-pipe 1 the resistances $r$ $r'$ $r^2$ will be successively short-circuited, so as to regulate the current in the usual manner.

To control the pressure in the train-pipes, I prefer to employ manually-operated valve mechanism such as illustrated in Figs. 3 to 9. For convenience the reversing-valve as well as the series-parallel and rheostatic valves are all associated in a single frame or casing 20, as shown in Figs. 3 and 4, and an interlocking mechanism is provided, which prevents the reversing-valve from being turned when the rheostatic valve is open. This interlocking mechanism may consist of a lever L, pivoted to the frame at $l$ and having arms or projections 21 22, engaging, respectively, with the periphery of a disk 23 on the spindle or shaft $b'$ of the valve mechanism B and with the arm or cam 24 on the operating-shaft $c'$ of the reversing-valve C. The disk 23 has a notch 25, which registers with the projection 21 on stop-lever L when the valve B is in its closed position, cutting off all air-supply from train-pipes 1 and 2. Under these conditions the reversing-valve may be freely operated, its cam 24 throwing the locking-lever over and the projection 21 entering notch 25; but when the valve B is turned to let pressure into pipes 1 and 2 the disk 23 locks the cam and the whole valve mechanism C from movement. A spring 27 holds the stop-lever arm 22 against cam 24, and this arm may be provided with an antifriction-roll 26.

The valve mechanism B comprises a valve-plate 28, fixed to shaft $b'$ and coöperating with valve-seat 29, which has an outer port 30, communicating through pipe $2^a$ with series-parallel train-pipe 2, and two inner ports 31 32, communicating through pipe $1^a$ with rheostatic train-pipe 1. Above the valve-plate 28 is a chamber 33, which is in constant communication through pipe $4^a$ with the air-pressure pipe 4. The valve-plate 28 has a pressure-channel 34 extending vertically through same and coöperating with ports 30, 31, and 32 to admit the air from chamber 33 and pressure-pipe 4 to the train-pipes 1 2. On the under side of valve-plate 28 is an exhaust-channel 35, communicating with an exhaust-duct 73 in the side of shaft $b'$ and coöperating with ports 30 and 31 to allow the compressed air to flow out from the train-pipes 1 and 2, and thus relieve the pressure in same when the valve B is in the position shown, which is its position when the train is at rest. In Fig. 7 the positions of the ports 30 31 32 are indicated by dotted lines, and radial lines (marked $1^\times 2^\times 3^\times 4^\times 5^\times 6^\times 7^\times$) indicate the successive angular positions of the radial leg of channel 34, position $1^\times$ being the position when the train is at rest. It will be noted that when the valve-plate is turned in the direction of the arrow in this figure it will first in position $2^\times$ cut off the exhaust connection before channel 34 makes communication through port 32 with the rheostatic train-pipe. When the valve is turned to position $3^\times$, compressed air flows to the train-pipe 1 through channel 34 and port 32, and the degree of pressure can be regulated by the time the valve is allowed to stay in this position, it being understood that it requires an appreciable time for the valve to deliver sufficient air to the train-pipe to bring it up to full pressure. This increase of pressure may, however, be arrested at any point, so as to maintain any desired amount of pressure in the train-pipe, by simply shifting the valve back to the cut-off position $2^\times$. By thus graduating the pressure in the train-pipe 1 I am enabled to bring the rheostatic controlling devices into successive action to gradually increase or maintain the acceleration effect. In these positions the air-pressure is cut off from the series-parallel train-pipe, so that the motors are maintained in series relation. Position $4^\times$ is also a cut-off position, cutting off the air from all the pipes, and the next step $5^\times$ brings the exhaust-channel 35 over the port 32, thus draining the train-pipe of its air and causing the rheostatic controlling devices to return to their original position preparatory to the change of the motors from series to parallel relation. Position $6^\times$ brings the outer leg of channel 34 over port 30, and thus admits compressed air to the series-parallel train-pipe 2, thus throwing the series-parallel switch, and position $7^\times$ then admits air to pipes 1 and 2 again by coöperation of channel 34 and port 31, the motors being thus put in circuit in parallel relation and the current through same being regulated, as before, through means of the rheostatic pipe.

A pawl 90, coöperating with a toothed or ratchet wheel 91 on shaft $b'$, may be provided to control or prevent back motion of handle $b$.

The reversing-valve comprises a valve-plate 36, fixed to the operating-shaft $c'$, and a valve-seat 37, having an exhaust-port 38 and a port 39, communicating by a pipe $3^a$ with the reversing train-pipe 3. Above the valve-plate 36 is a chamber 31, communicating by pipe $4^b$ (see Fig. 1) with the main fluid-pressure-supply pipe 4, and a passage 43, extending through the valve-plate 36, is arranged to put this chamber in communication with the port 39 and train-pipe 3 when the reversing-valve is turned in one direction, thus throwing the reversing-switches on all the cars. When turned in the other direction, a channel 42 on the lower side of said plate puts the port 39 in communication with exhaust-port 38, as indicated by dotted lines in Fig. 9. Both the series-parallel valve B and the reversing-valve C are provided with flanges 70 on their casing, which, engaging with lugs 71 on their projective handles, prevent withdrawal of same until they are brought to the position which puts the corresponding train-pipes into communication with the exhaust, thus opening all circuits and insuring that the train shall be in non-operative condition when the handles are removed.

Referring now to Figs. 10 to 15, it will be observed that each of the pneumatically-operated controlling devices N O P comprises in addition to its main operating-cylinder $n$, $o$, or $p$ a pop-valve Q, whose construction is more clearly shown in Figs. 13 and 14. This pop-valve comprises a pressure-chamber 44, adapted to be attached to a pipe 40 and communicate through same with the pressure-pipe 1, 2, or 3, as the case may be, an exhaust-chamber 45, having openings 46 leading to the outer air, and an intermediate chamber 47, communicating with the operating-cylinder of the controlling device N, O, or P. The puppet 48 is guided by an extension 49, running in cylindrical chamber 44 and having channels $49^a$ to permit passage of air, and said puppet is capable of seating either against a seat 50, closing the communication from the intermediate chamber 47, and therefore from the controlling device N, O, or P to the outer air, or against a seat 51, closing the communication to said chamber from the pressure-pipe, it being normally held in this latter position by a spring 52, whose force is adjustable by means of a set-screw 53. The pop-valve may thus be set to a nicety to open at a definite pressure in the pipes 1, 2, or 3, to which it is connected. It will be observed that the moment this double-seated pop-valve leaves seat 51 it closes against seat 50, thus cutting off the exhaust connection to the outer air, and is then held firmly against this seat by the pressure of the air beneath it.

The rheostatic controlling device, Fig. 10, is provided with an auxiliary cylinder 58, connected between the pop-valve Q and the main cylinder $n$ and containing a piston 59, which acts as an automatic slide-valve, said piston being normally held by a spring 60 in position to open the connection between the port 61 of the main cylinder and the exhaust-aperture 62, leading to the outer air, but to close or shut off the communication from said cylinder-port to a port 63, leading through a pipe 64 to the main air-supply pipe 4. The connection 66 from the intermediate chamber 47 leads back of auxiliary piston or slide-valve 59, so that when pressure comes onto the intermediate chamber due to the response of the pop-valve to the predetermined pressure in the train-pipe 1 the slide-valve is at once thrown against the action of its spring 60 to close the exhaust connection through port 62 and open the connection through the pipe 64 from pressure-pipe 4 to the main cylinder $n$. This cylinder has differential pistons 67 68, and the space between the pistons communicates by a passage 65 with pipe 64, and, the piston 67 being the larger one, the piston-rod 5 is normally forced into the position shown in Fig. 10. This port 61 leads at 75 into the main cylinder $n$ and it has openings 76 77 into the cylinder 58, opening 76 being just below the piston 59 when the latter is in its uppermost position and opening 77 being opposite the pressure-port 63 and being normally cut off therefrom by piston 59, but put in communication therewith by channel 78 in piston 59 when the latter is in its lowest position, as indicated by dotted lines in Fig. 10. When the slide-valve 59 operates as above described and pressure comes in the port 61 to back of piston 67, the piston-rod or plunger 5 is driven, so as to establish electrical connection, as above referred to. Fig. 15 indicates the preferred arrangement of the contact devices, the plunger 5 carrying the contact 9, insulated therefrom, but connected by a flexible connection 68 to the line connection 19 and the fixed contact 13 being located in the line of motion of the movable contact 9, so as to be engaged thereby. In this figure the structural arrangements of the pop-valve and slide-valve in relation to the main cylinder are shown somewhat modified for the sake of compactness, but the principle of operation remains the same.

The rheostatic controller comprises as many elements, such as are shown in Fig. 15, as there are points of resistance to be operated, and the controlling-springs of the pop-valves of the respective elements are adjusted to different strengths, so as to come into operation successively as successive increments of pressure in train-pipe 1, and each pop-valve as it comes into operation at once throws the corresponding slide-valve so as to put the main operating-cylinder of that element in direct connection with the air-pressure pipe independent not only of the pop-valve, but of the manual controlling device B. The rheostatic element will thus be operated by direct connection on each car to the source of air-supply, thus giving simultaneous and effective operation of the rheostatic controlling element on each car, such as could not be attained if the operation was dependent solely on the supply of air passing through the manual controllers and the pop-valves. On the other hand, all of the rheostatic elements which have been operated are still under the control of the manual controller B and the pop-valves Q, since as soon as the controller B is operated to relieve the air-pressure in train-pipe 1 by cutting off connection to the train-pipe 4 and opening connection to exhaust the pop-valves will fly back under the influence of the springs 52 and the exhaust connection will at once be opened from back of slide-valve 59 through connection 66 to back chamber of pop-valve and the exhaust-openings 46, so that the slide-valve will instantly fall back under the influence of its spring, cutting off connection of main cylinder $n$ with train-pipe 4 and opening connection to exhaust at 62, whereupon the differential pistons will be driven back by reason of the difference in total pressure in the two pistons.

The plungers 17 18 of the series-parallel controlling device and the reversing device, Figs. 11 and 12, are operated by pistons 80 81, working in cylinders $o$ $p$ in direct connection with the intermediate chambers 47 of the corresponding pop-valves Q, the operation of these devices being thus effected wholly through the pop-valve connection. It will, however, be understood that an auxiliary connection and slide-valve may be used in connection with these devices, and, on the other hand, the rheostatic devices may be operated by the direct connected mechanism of Figs. 11 and 12. Inasmuch, however, as it is of the highest importance that the connections in the several cars should all be closed at the same instant, it will be seen that the device shown in Fig. 10 is especially desirable for use as the rheostatic device which controls the actual closure of the circuit. Springs 82 83 return the plungers 17 18 to their normal positions when the air-pressure on the pistons 80 81 is relieved.

It will be understood that instead of the pneumatic mechanism herein referred to I may use fluid-pressure mechanism of any kind operating in substantially equivalent manner, and the word "pressure" as herein used may be taken to include "negative pressure" or "vacuum," as the latter may be used in similar manner.

In a broad sense my invention includes the operation of a train by pneumatic control of the series-parallel, rheostatic, and reversing switches, and while I have here shown the same as controlled by separate train-pipes I may, if desired, arrange to operate any two or more of such kinds of controlling devices, such as the series-parallel and the rheostatic, by means of the same train-pipe, the said devices coming into operation successively in response to successive increments of pressure in a manner similar to that above explained for the several sections of the rheostatic device.

Having thus described my invention, the following is what I claim as new therein and desire to secure by Letters Patent:

1. The combination with an electrically-propelled train comprising a plurality of motor-cars, of electric controlling apparatus on each car for controlling the operation thereof, fluid-pressure mechanism connected to and operating said controlling apparatus, a source of fluid-pressure supply connected to each motor-car, a controlling-pipe extending to all of the motor-cars and means for controlling the fluid-pressure therein, and automatic valve mechanism connected to the aforesaid controlling devices to the source of fluid-pressure and to the controlling-pipe and responding to certain conditions of pressure in the controlling-pipe to open communication between the fluid-pressure mechanism and the source of fluid-pressure.

2. The combination with an electrically-propelled train comprising a plurality of motor-cars, of electric controlling apparatus on each car for controlling the operation thereof, fluid-pressure mechanism connected to and operating said controlling apparatus, a source of fluid-pressure supply connected to each motor-car, a controlling-pipe extending to all of the motor-cars and means for controlling the fluid-pressure therein, and automatic pneumatically-controlled valve mechanism connected to the aforesaid controlling devices, to the source of fluid-pressure, to the outer air, and to the controlling-pipe, and responding to certain conditions of pressure in the controlling-pipe to open communication between the fluid-pressure mechanism and the source of fluid-pressure and close the communication from same to the outer air, and under other conditions to close the communication to the said fluid-pressure mechanism from the source of fluid-pressure supply and open communication from same to the outer air.

3. The combination with an electric switch of pneumatic mechanism for operating same, comprising a cylinder, a piston moving therein and connected to the switch, a source of fluid-pressure supply, a pneumatically-operated valve connected to said cylinder and placing same in communication either with the source of fluid-pressure or with the outer air, according to its position, a controlling-pipe, means connected thereto and controlling the operation of said valve and means for controlling the pressure in said pipe.

4. The combination with an electric switch, of a pneumatic operating device for same, a source of air-pressure supply, a valve controlling the connections from the source of air-pressure supply to the switch-operating device, pneumatically-operated means for operating such valve, a manually-controlled valve controlling a connection between the source of air-supply and such pneumatic valve-operating means, and a pop-valve included in such connection and provided with means normally closing the connection but responsive to a definite pressure in same to open communication to the said pneumatically-operated valve.

5. The combination with an electric switch, of a pneumatic operating device for same, a source of air-pressure supply, a pneumatically-operated valve controlling the communication to said switch-operating device, from the source of air-pressure supply and the outer air, a manually-controlled valve and a connection controlled thereby between the source of air-supply and the pneumatically-operated valve, and a pneumatically-controlled pop-valve included in such connection and normally closing the connection, while opening the pneumatic valve to communicate with the outer air, but responsive to a definite pressure in such connection to open the communication to the pneumatic valve from such connection while closing the communication to the outer air.

6. The combination with an electric controlling device, of a pneumatic operating device for same, a controlling-pipe leading to a source of air-pressure supply and provided with a valve for controlling the pressure therein, and a pop-valve connected to said controlling-pipe, to the said operating device and to the outer air and responding to a definite pressure in the controlling-pipe to place same in communication with the said operating device while cutting off communication from the latter to the outer air.

7. The combination with a plurality of electric switching devices, of fluid-pressure mechanisms for operating same, a fluid-pressure-supply pipe and means for regulating the pressure therein, and a plurality of automatically-operating valves connected to said supply-pipe and to said mechanisms and acting normally to cut off the communication between said supply-pipe and the said switch-operating mechanisms but responding to different conditions of pressure in said pipe to put same in communication with the respective switch-operating mechanisms.

8. The combination with a plurality of electric switching devices, of fluid-pressure mechanisms for operating same, a fluid-pressure-supply pipe and means for regulating the pressure therein, and a plurality of automatically-operating valve mechanisms connected to said supply-pipe and to said mechanisms and acting normally to cut off the communication between said supply-pipe and the said switch-operating mechanisms but responding to different conditions of pressure in said pipe to put same in communication with the respective switch-operating mechanisms.

9. The combination with an electrically-propelled train, comprising a plurality of motor-cars each having its own motor equipment, of a plurality of electric controlling devices for the motor equipment of each motor-car, a plurality of fluid-pressure devices operating the respective electric controlling devices and responding to different pressures, a pipe connecting with all of such fluid-pressure devices and means for controlling the fluid-pressure in such pipe.

WILLIAM COOPER.

Witnesses:
VERNON L. COATE,
LEWIS L. TATUM.